(12) United States Patent  (10) Patent No.: US 8,058,841 B2
Chander et al.  (45) Date of Patent: Nov. 15, 2011

(54) RETRACTABLE OVERHEAD CHARGING CORD DISPENSER FOR VEHICLES

(75) Inventors: Bala Chander, Canton, MI (US); Ted James Miller, Milan, MI (US); David W Schultz, Livonia, MI (US); Dale Gilman, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 12/258,406

(22) Filed: Oct. 25, 2008

(65) Prior Publication Data
US 2010/0102775 A1  Apr. 29, 2010

(51) Int. Cl.
*H01M 10/46* (2006.01)
(52) U.S. Cl. ....................................................... 320/115
(58) Field of Classification Search .................. 320/107, 320/111, 114, 115; 414/281, 283
See application file for complete search history.

(56) References Cited

U.S. PATENT DOCUMENTS

| 4,587,383 | A | 5/1986 | Stoldt |
| 5,306,999 | A | 4/1994 | Hoffman |
| 5,323,099 | A | 6/1994 | Bruni et al. |
| 5,461,298 | A | 10/1995 | Lara et al. |
| 5,821,731 | A | 10/1998 | Kuki et al. |
| 6,216,834 | B1 | 4/2001 | Steinhovden |
| 6,338,450 | B1 | 1/2002 | Schwendinger |
| 6,439,360 | B1 * | 8/2002 | Miller ...................... 191/12.2 R |
| 6,614,204 | B2 | 9/2003 | Pellegrino et al. |
| 6,854,575 | B1 * | 2/2005 | Desormeaux et al. ....... 191/12.4 |
| 7,563,130 | B2 * | 7/2009 | Farrar et al. ................... 320/111 |
| 2007/0126395 | A1 | 6/2007 | Suchar |

* cited by examiner

*Primary Examiner* — Edward Tso
(74) *Attorney, Agent, or Firm* — David Kelley, Esq.; Tung & Associates

(57) ABSTRACT

The present invention is generally directed to a retractable overhead charging cord dispenser which has multi-positioning capability to provide plug-in electric power to PHEVs parked at various positions in a garage or the like. An illustrative embodiment of the retractable overhead charging cord dispenser includes an arm assembly, a cord guide arm carried by the arm assembly, a cord storage device provided in the arm assembly and a retractable charging cord extendable from the cord storage device and extending through and protruding from the cord guide arm.

16 Claims, 3 Drawing Sheets

RETRACTABLE OVERHEAD CHARGING CORD DISPENSER FOR VEHICLES

FIELD OF THE INVENTION

The present disclosure relates to plug-in hybrid electric vehicles (PHEVs). More particularly, the present disclosure relates to a retractable overhead Charging cord dispenser which has multi-positioning capability to provide plug-in electric power to PHEVs parked at various positions in a garage or the like.

BACKGROUND OF THE INVENTION

Plug-in electric vehicles (PHEVs) may require connection to a 110-volt electrical outlet periodically for recharging purposes. Although it may be carried out indoors or outdoors, recharging of a PHEV is frequently carried out in an owner's garage. The manner in which the charging cord is connected to the vehicle depends typically on four factors: (1) the layout of the garage (whether a 1, 2 or three-car garage); (2) the location of the 110V electrical outlet in the garage; (3) the location of the charging port on the vehicle; and (4) the location of the PHEV relative to other vehicles in the garage.

In typical recharging of the PHEV, a charging cord is first connected to the vehicle and then to the electrical outlet, which may be positioned about 2~4 feet off the floor. A standard length charging cord (about 25 ft.) may hinder access to the garage or opening of vehicle doors, become a trip hazard or be driven over multiple times and thereby become damaged.

Therefore, a retractable overhead Charging cord dispenser which has multi-positioning capability to provide plug-in electric power to PHEVs parked at various positions in a garage or the like is needed.

SUMMARY OF THE INVENTION

The present disclosure is generally directed to a retractable overhead charging cord dispenser which has multi-positioning capability to provide plug-in electric power to PHEVs parked at various positions in a garage or the like. An illustrative embodiment of the retractable overhead charging cord dispenser includes an arm assembly, a cord guide arm carried by the arm assembly, a cord reel or other suitable cord-storage device provided in the arm assembly and a retractable charging cord extendable from the cord reel or other suitable cord-storage device and extending through and protruding from the cord guide arm.

BRIEF DESCRIPTION OF THE DRAWINGS

The disclosure will now be made, by way of example, with reference to the accompanying drawings, in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Figure 1:
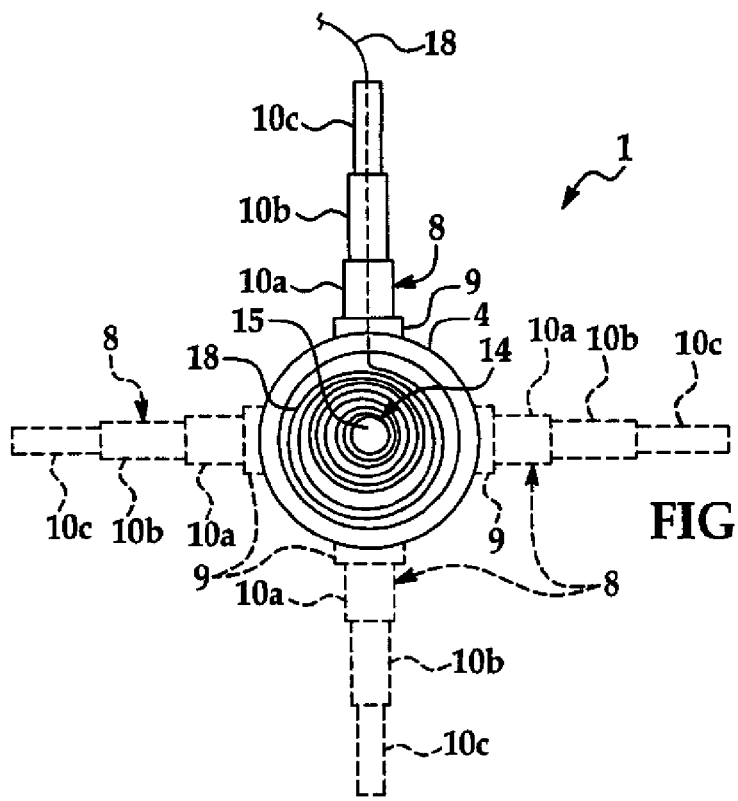
FIG. 1 is a top view of an illustrative embodiment of the retractable overhead Charging cord dispenser.
Figure 2:
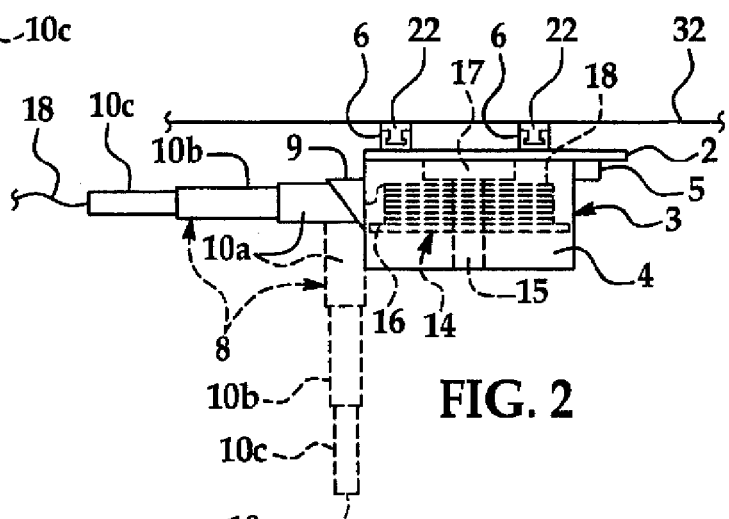
FIG. 2 is a side view of an illustrative embodiment of the retractable overhead Charging cord dispenser, mounted on a ceiling (in section) of a garage.

Referring initially to FIGS. 1-4 of the drawings, an illustrative embodiment of the retractable overhead Charging cord dispenser, hereinafter dispenser, is generally indicated by reference numeral 1. The dispenser 1 may include a mount frame 2 and an arm assembly 3 provided on the mount frame 2. The arm assembly 3 may include a generally cylindrical arm frame 4 which is rotatably mounted on the mount frame 2 according to the knowledge of those skilled in the art. As shown in FIG. 2, a guide arm motor 5 may be provided on the mount frame 2 and engage the arm frame 4 to rotate the arm frame 4 with respect to the mount frame 2. The guide arm motor 5 may be remote-controlled, as will be hereinafter described.

A cord guide arm 8 extends from the arm frame 4. In some embodiments, the cord guide arm 8 is selectively extendable and retractable and may include an arm mount bracket 9 which is provided on the arm frame 4. At least two arm sections 10 are pivotally mounted on the arm mount bracket 9 and telescopically extendable from each other. In the embodiment shown in FIG. 1, the cord guide arm 8 includes a first arm section 10a pivotally mounted on the arm mount bracket 9; a second arm section 10b telescopically extendable from the first arm section 10a; and a third arm section 10c telescopically extendable from the second arm section 10b. By operation of the guide arm motor 5 (FIG. 2, the cord guide arm 8 is capable of 360 degree positioning around the arm frame 4, as shown in phantom in FIG. 1. Moreover, as shown in FIG. 2, the cord guide arm 8 is capable of selectively pivoting between the horizontal, outwardly-extended position indicated by the solid lines and the vertical, downwardly-extended position indicated by the phantom lines. A spring (not shown) or other bias mechanism may be provided to normally bias the cord guide arm 8 in the upper, generally horizontal position indicated by the solid lines.

A cord reel or other suitable cord storage device 14 is rotatably mounted on the mount frame 2 inside the arm frame 4. As shown in FIG. 2, the cord storage device 14 may include a reel shaft 15 which may be engaged for rotation by an electric cord storage device motor 17 that may be mounted on the mount frame 2. In some embodiments, the cord storage device motor 17 may be a cord reel motor. A circular reel panel 16 may be provided on the reel shaft 15. A charging cord 18 is wound on the reel shaft 15 and extends through an opening (not shown) provided in the arm frame 4 and through the arm sections 10 of the cord guide arm 8. Accordingly, by operation of the cord storage device motor 17, a selected length of the cord 18 may be selectively unwound from the cord storage device 14 and extended from the cord guide arm 8 or wound on the cord storage device 14 and retracted into the cord guide arm 8. The cord storage device motor 17 may be remote-controlled, as will be hereinafter described.

Figure 3:
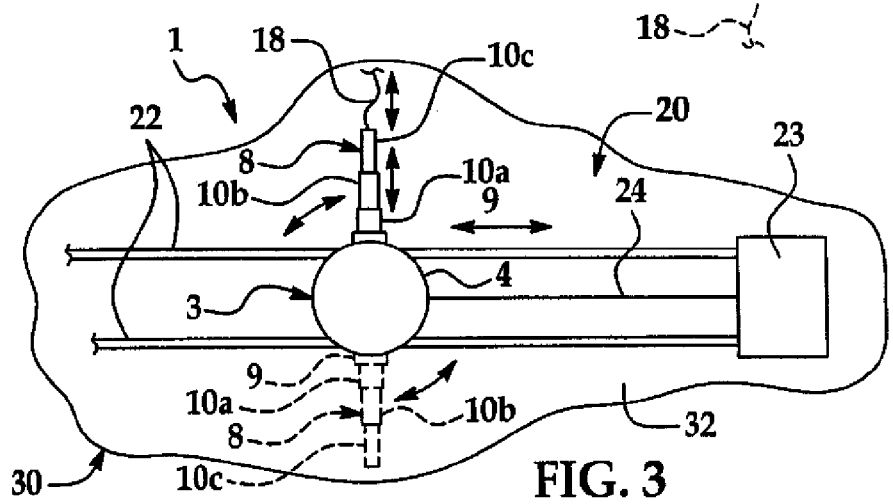
FIG. 3 is a bottom view of an illustrative embodiment of the retractable overhead Charging cord dispenser, mounted on a pair of track rails provided on a ceiling of a garage.
Figure 4:
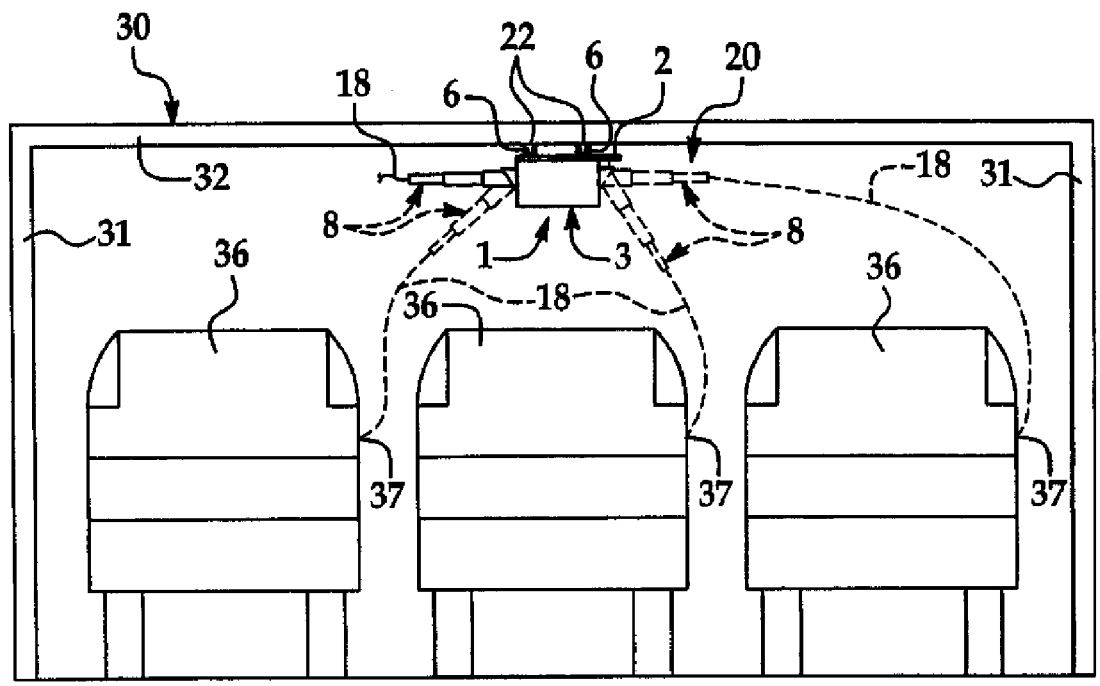
FIG. 4 is an interior view of a garage, with an illustrative embodiment of the retractable overhead charging cord dispenser mounted on a pair of longitudinally-mounted track rails provided on the ceiling of the garage and multiple PHEVs parked in various locations in the garage, more particularly illustrating multi-positioning capability of a charging cord extending from the dispenser to facilitate recharging of the PHEVs.

As shown in FIGS. 2-4, in some applications the dispenser 1 may be utilized as a vehicle charging system 20. For example, at least one track rail 22 may be attached to a ceiling 32 of a garage 30 having spaced-apart side walls 31. The garage 30 may be a single-car garage or a multi-car garage. A pair of generally parallel, spaced-apart track rails 22 may be attached to the ceiling 32 according to the knowledge of those skilled in the art. As shown in FIGS. 2 and 4, a pair of spaced-apart rail brackets 6 may be provided on the mount frame 2 of the dispenser 1. The rail brackets 6 slidably engage the track rails 22 on the ceiling 32 of the garage 30. As shown in FIG. 3, a track motor 23 is provided on the ceiling 32 and drivingly engages an attachment structure 24 which is attached to the dispenser 1. The attachment structure 24 may be any structure which is capable of transmitting movement from the track motor 23 to the dispenser 1 along the track rails 22. Accordingly, by selective operation of the track motor 23, the dispenser 1 travels along the track rails 22 as the attachment structure 24 is extended and retracted by the track motor 23. The track motor 23 may be remote-controlled, as will be hereinafter described, or alternatively, may be programmed for automatic operation. In some applications, the dispenser 1 may be attached to or incorporated into a garage door opener (not shown) which is provided on the ceiling 32.

Figure 5:
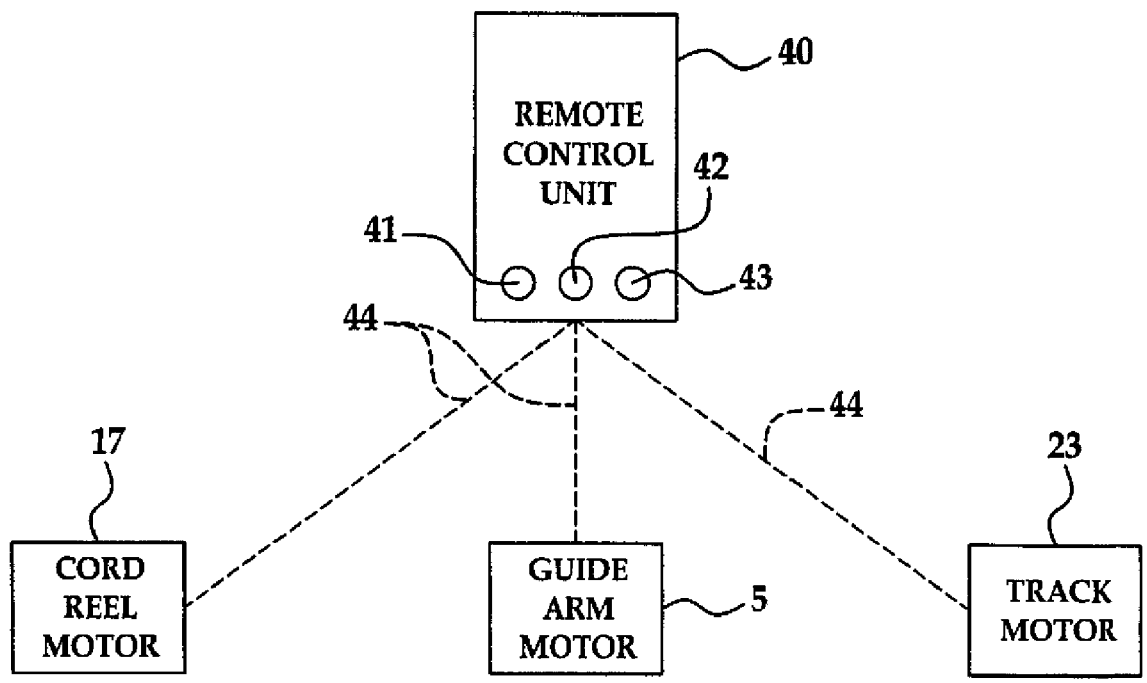
FIG. 5 is a block diagram which illustrates selective activation of a cord reel or cord storage device motor, a guide arm motor and a track motor elements of an illustrative embodiment of the retractable overhead Charging cord dispenser.
Figure 6:
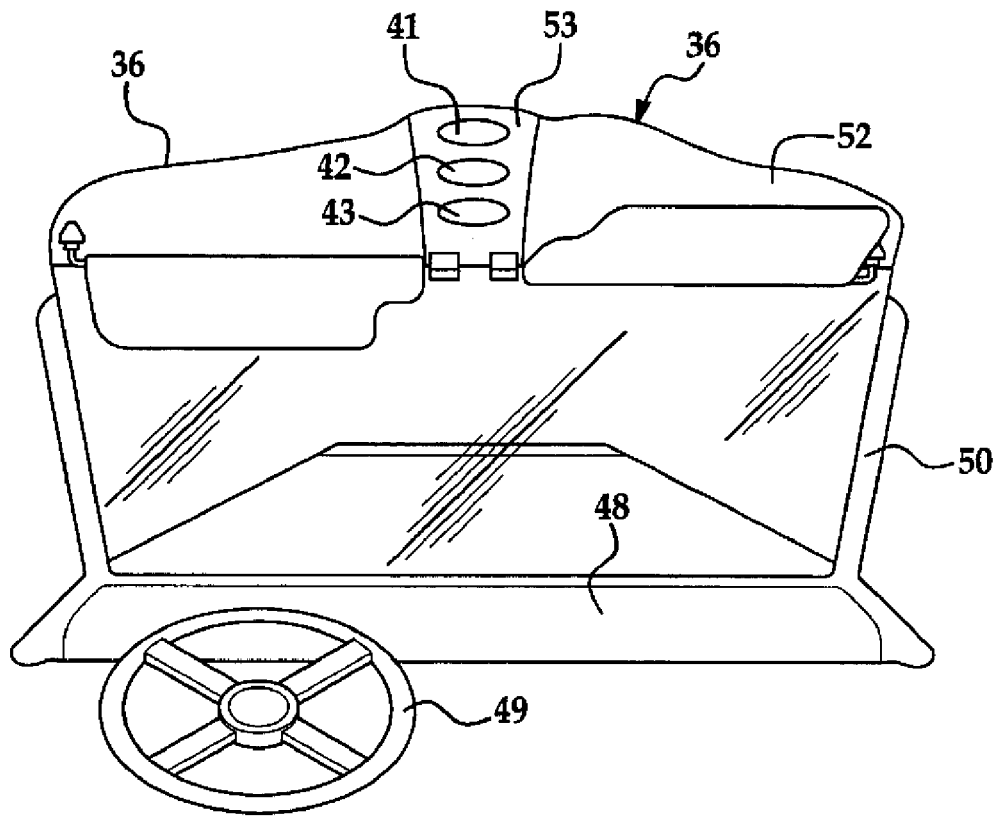
FIG. 6 is an interior view of a PHEV, with control features for the cord reel or cord storage device motor, the guide arm motor and the track motor provided on a ceiling console of the PHEV.

Referring next to FIGS. 5 and 6, in some applications a remote control unit 40 (FIG. 5), which may be a hand-held unit, for example and without limitation, may be adapted to effect remote-controlled operation of the cord storage device motor 17, the guide arm motor 5 and/or the track motor 23. In some applications, the remote control unit 40 may be provided on or as a part of a key fob, a homelink/universal garage door opener or other device (not shown). Accordingly, a reel motor control 41; an arm motor control 42; and a track motor control 43 may be provided on the remote control unit 40. Manipulation of the reel motor control 41, the arm motor control 42 and the track motor control 43 facilitates the emission of RF signals 44 which wirelessly operate the cord storage device motor 17, the guide arm motor 5 and the track motor 23, respectively, from a remote location. The RF signals 44 may be Bluetooth enabled.

As shown in FIG. 6, in some applications the reel motor control 41, the arm motor control 42 and the track motor control 43 may alternatively or additionally be provided inside a plug-in hybrid electric vehicle (PHEV) 36. For example and without limitation, the reel motor control 41; the arm motor control 42; and the track motor control 43 may be provided on the ceiling console 53 on the ceiling 52 of the PHEV 36. The reel motor control 41, the arm motor control 42 and the track motor control 43 may alternatively be provided on the dashboard 48, the steering wheel 49, the windshield frame 50 or other location inside the PHEV 36.

Figure 4A:
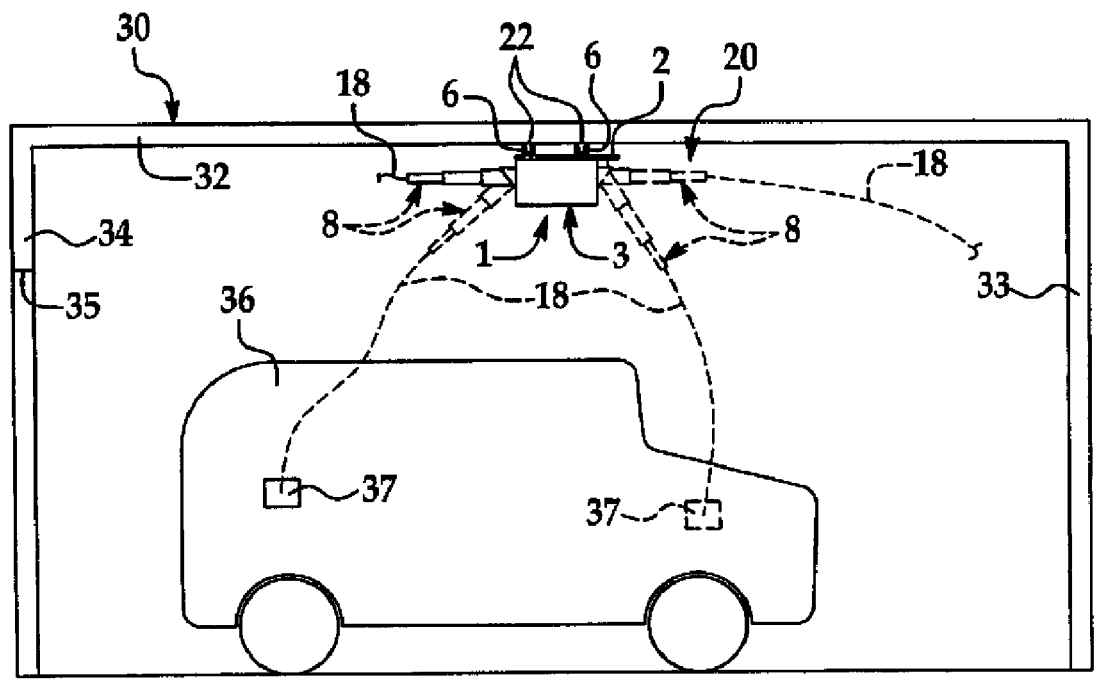
FIG. 4A is an interior view of a garage, with an illustrative embodiment of the retractable overhead charging cord dispenser mounted on a pair of transversely-mounted track rails provided on the ceiling of the garage.

Referring next to FIGS. 4 and 4A, in typical application the retractable overhead Charging cord dispenser 1 is utilized as part of a vehicle charging system 20 to facilitate charging of a PHEV 36. Accordingly, the dispenser 1 is installed on the ceiling 32 of the garage 30 typically as was heretofore described with respect to FIGS. 2-4. The charging cord 18 (FIG. 2) of the dispenser 1 is connected to an electrical power source (not shown) such as a 120-volt electrical outlet (not shown) for example. A PHEV 36 can be parked at any location in the garage 30 to facilitate recharging of the PHEV 36, regardless of the location of the charging port 37 on the PHEV 36. The charging cord 18 can be dispensed from the cord storage device 14 and through the cord guide arm 8 until the length of the charging cord 18 is sufficient to plug the charging cord 18 into the charging port 37 of the PHEV 36. This may be facilitated by operating the cord storage device motor 17. The dispenser 1 can be adjusted along the track rails 22 by operation of the track motor 23 as needed to position the charging cord 18 in general alignment with the charging port 37. Furthermore, the position of the cord guide arm 8 around the circumference of the arm frame 4 of the dispenser 1 can be selectively adjusted by operation of the guide arm motor 5 to enhance proximity of the charging cord 18 to the charging port 37. The cord guide arm 8 can be selectively pivoted from the straight, horizontal position shown in solid lines to the angled position shown in phantom lines in FIG. 4, typically by manually pulling downwardly on the charging cord 18, to extend the reach of the charging cord 18 to the charging port 37. After charging of the PHEV 36 is completed, the charging cord 18 can be retracted back into the cord storage device 14 in the dispenser 1. In some embodiments the cord storage device motor 17, the guide arm motor 5 and the track motor 23 can be operated from a remote location such as by manipulation of the reel motor control 41 on the remote control unit 40 (FIG. 5) or inside the PHEV 36 (FIG. 6), for example, as was heretofore described. As shown in FIG. 4A, in some applications the track rails 22 of the dispenser 1 may be mounted on the ceiling 32 of the garage 30 in transverse relationship rather than longitudinal relationship with respect to a PHEV or PHEVs 36 parked in the garage 30. The track rails 22 are generally parallel to a front wall 33 and to a garage opening 35 provided in a rear wall 34 of the garage 30.

It will be appreciated by those skilled in the art that in some applications, operation of the cord storage device motor 17 to extend the charging cord 18 may be triggered or initiated by opening of the charging port 37 and/or upon turning of the engine (not shown) of the PHEV 36 off. Operation of the cord storage device motor 17 retract the charging cord 18 may be triggered or initiated by closing of the charging port 37 and/or upon turning of the engine of the PHEV 36 on. Operation of any or all of the cord storage device motor 17, the guide arm motor 5 and the track motor 23 may be implemented by remote control or may be automatic.

While the preferred embodiments of the invention have been described above, it will be recognized and understood that various modifications can be made in the invention and the appended claims are intended to cover all such modifications which may fall within the spirit and scope of the invention.

The invention claimed is:

1. A retractable overhead charging cord dispenser, comprising:
   an arm assembly;
   a cord guide arm carried by said arm assembly;

a cord storage device provided in said arm assembly;

a cord storage device motor drivingly engaging said cord storage device; and a retractable charging cord extendable from said cord storage device and extending through and protruding from said cord guide arm.

2. The dispenser of claim 1 further comprising a remote control unit adapted for remote control of said cord storage device motor.

3. The dispenser of claim 1 wherein said cord guide arm is selectively extendable and retractable in length.

4. The dispenser of claim 3 wherein said cord guide arm is telescopically extendable.

5. The dispenser of claim 1 wherein said cord guide arm is pivotally carried by said arm assembly.

6. The dispenser of claim 1 further comprising a guide arm motor operably engaging said arm assembly and adapted to rotate said cord guide arm in a circular motion around said arm assembly.

7. The dispenser of claim 6 further comprising a remote control unit adapted for remote control of said cord storage device motor.

8. A retractable overhead charging cord dispenser, comprising:

at least one track rail;

an arm assembly slidably carried by said at least one track rail;

a track motor engaging said arm assembly;

a cord guide arm carried by said arm assembly;

a cord storage device provided in said arm assembly; and a retractable charging cord extendable from said cord storage device and extending through and protruding from said cord guide arm.

9. The dispenser of claim 8 further comprising a cord storage device motor drivingly engaging said cord storage device.

10. The dispenser of claim 9 further comprising a remote control unit adapted for remote control of said cord storage device motor.

11. The dispenser of claim 8 wherein said cord guide arm is selectively extendable and retractable in length.

12. The dispenser of claim 11 wherein said cord guide arm is telescopically extendable.

13. The dispenser of claim 8 wherein said cord guide arm is pivotally carried by said arm assembly.

14. The dispenser of claim 8 further comprising a guide arm motor operably engaging said arm assembly and adapted to rotate said cord guide arm in a circular motion around said arm assembly.

15. The dispenser of claim 14 further comprising a remote control unit adapted for remote control of said cord storage device motor.

16. A retractable overhead charging cord dispenser, comprising:

an arm assembly;

a cord guide arm carried by said arm assembly for 360 degree positioning around the arm assembly;

a cord storage device provided in said arm assembly; and a retractable charging cord extendable from said cord storage device and extending through and protruding from said cord guide arm.

* * * * *